US010248615B2

(12) United States Patent
Joy

(10) Patent No.: US 10,248,615 B2
(45) Date of Patent: Apr. 2, 2019

(54) DISTRIBUTED PROCESSING IN A NETWORK

(71) Applicant: Harman International Industries, Incorporated, Stamford, CT (US)

(72) Inventor: Lejin K. Joy, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 222 days.

(21) Appl. No.: 15/269,826

(22) Filed: Sep. 19, 2016

(65) Prior Publication Data

US 2018/0081854 A1 Mar. 22, 2018

(51) Int. Cl.
G06F 13/28 (2006.01)
G06F 13/38 (2006.01)
G06F 15/78 (2006.01)
G06F 15/173 (2006.01)

(52) U.S. Cl.
CPC ........ *G06F 15/17331* (2013.01); *G06F 13/28* (2013.01); *G06F 13/385* (2013.01); *G06F 15/7807* (2013.01)

(58) Field of Classification Search
CPC .. G06F 13/28; G06F 13/385; H04N 21/42607
See application file for complete search history.

(56) References Cited

U.S. PATENT DOCUMENTS

| 7,644,221 | B1 | 1/2010 | Chan et al. | |
|---|---|---|---|---|
| 7,949,766 | B2* | 5/2011 | Bakke | G06F 9/5027 |
| | | | | 709/228 |
| 8,059,532 | B2* | 11/2011 | Riddle | H04L 47/20 |
| | | | | 370/230 |
| 8,103,809 | B1 | 1/2012 | Michels et al. | |
| 8,396,953 | B2 | 3/2013 | Monchiero et al. | |
| 2010/0061240 | A1* | 3/2010 | Sindhu | H04L 49/1515 |
| | | | | 370/235 |
| 2010/0153763 | A1* | 6/2010 | Sood | G06F 1/3209 |
| | | | | 713/324 |
| 2010/0172257 | A1* | 7/2010 | Yu | H04L 63/0245 |
| | | | | 370/252 |

(Continued)

FOREIGN PATENT DOCUMENTS

WO    2007064135 A1    6/2007

OTHER PUBLICATIONS

"XILINX: LogiCORE IP Ethernet AVB Endpoint v2.4," XILINX Website, Available Online at https://www.xilinx.com/support/documentation/ip_documentation/eth_avb_endpoint_ds677.pdf, Jul. 23, 2010, 36 pages.

(Continued)

*Primary Examiner* — Ranodhi Serrao
(74) *Attorney, Agent, or Firm* — McCoy Russell LLP

(57) ABSTRACT

Examples are disclosed for distributing Ethernet data processing across multiple processing cores. In one example, a computing system includes a main host processor including multiple processing cores and a shared on-chip memory accessible by each of the multiple processing cores, and an Ethernet hardware subsystem communicatively coupled to the main host processor via a direct memory access (DMA) subsystem, the DMA subsystem configured to route data from the Ethernet hardware subsystem to one or more of the multiple processing cores.

16 Claims, 5 Drawing Sheets

(56) References Cited

U.S. PATENT DOCUMENTS

| | | | |
|---|---|---|---|
| 2010/0322088 A1* | 12/2010 | Muthiah | G06F 9/5055 370/252 |
| 2010/0325263 A1* | 12/2010 | Raja | H04L 43/04 709/224 |
| 2011/0225278 A1* | 9/2011 | Monchiero | H04L 49/901 709/223 |
| 2012/0069131 A1* | 3/2012 | Abelow | G06Q 10/067 348/14.01 |
| 2012/0124398 A1* | 5/2012 | Diab | H04L 41/0833 713/310 |
| 2012/0131245 A1* | 5/2012 | Wilcox | G06F 13/4273 710/106 |
| 2012/0147271 A1* | 6/2012 | Choi | H04N 5/765 348/572 |

OTHER PUBLICATIONS

European Patent Office, Extended European Search Report Issued in Application No. 17191328.8, dated Jan. 29, 2018, Germany, 8 pages.

\* cited by examiner

DISTRIBUTED PROCESSING IN A NETWORK

FIELD

The disclosure relates to distributed architecture for network processing in networks such as Ethernet Audio Video Bridging (AVB) networks.

BACKGROUND

AVB defines low latency Class A traffic with a maximum latency of 2 ms over 7 hops and higher latency Class B traffic with a maximum latency of 50 ms over 7 hops. Audio streaming standards, such as AVB 61883-6 Audio Format, suggests "A Class A isochronous packet is generated every 8 kHz." In such audio formats, such a packet represents 125 µs worth of audio. Accordingly, an audio CD type (16 bit sample, stereo) stream at 48 kHz generates 6 samples, which implies 24 Bytes of payload. In examples where 2 ms worth of audio is buffered, sending audio data at 125/250 µs interval may pose a challenge with respect to implementation.

Class AB traffic is configured to be shaped or scheduled with a 125/250 µs interval rate. Queuing of a particular class of AVB stream is typically configured such that only MaxIntervalFrames of each stream may be scheduled within one scheduling cycle (125 µs for class A, 250 µs for class B). Accordingly, a software scheduling task is to be run at the frequency of the scheduling cycle (125/250 µs). On a preemptive Multitasking Operating System (e.g. Linux, QNX, Windows) a scheduling cycle of 125/250 µs is not very feasible, and if implemented as interrupt service routine, the additional load of this overhead may drastically lower system performance.

SUMMARY

Embodiments are disclosed for providing a distributed Ethernet AVB stack that has various modules distributed to multiple cores in order to share a network processing load. In one example, a computing system includes a main host processor including multiple processing cores and a shared on-chip memory accessible by each of the multiple processing cores, and an Ethernet hardware subsystem communicatively coupled to the main host processor via a direct memory access (DMA) subsystem, the DMA subsystem configured to route data from the Ethernet hardware subsystem to one or more of the multiple processing cores.

The disclosure also provides for an example method of distributing a processing load between multiple cores of a host processor in an Audio/Video Bridging (AVB) computing system. The example method includes receiving data, from an Ethernet hardware subsystem of the AVB computing system, at a direct memory access (DMA) subsystem of the AVB computing system, determining if the data includes best effort traffic or AVB traffic, and responsive to determining that the data includes best effort traffic, transmitting the best effort traffic to an application processor of the host processor, and responsive to determining that the data includes AVB traffic, transmitting the AVB traffic to one or more of an AVB audio processing core of the host processor and an AVB video processing core of the host processor.

The disclosure also provides for an AVB computing system including a main host processor including at least one AVB data processing core, at least one application processor, and a shared on-chip memory accessible by each of the at least one AVB data processing core and the at least one application processor, a direct memory access (DMA) subsystem comprising one or more transmit channels and one or more receive channels, and an Ethernet hardware subsystem communicatively coupled to the main host processor via the direct memory access (DMA) subsystem, the DMA subsystem configured to route data between the Ethernet hardware subsystem and one or more of the at least one AVB data processing core and the at least one application processor.

BRIEF DESCRIPTION OF THE DRAWINGS

The disclosure may be better understood from reading the following description of non-limiting embodiments, with reference to the attached drawings, wherein below.

DETAILED DESCRIPTION

Current approaches to distribute processing include equipping the software modules/server with further network interfaces connected to further processors in order to distribute the network interface processing load across multiple processors. Such approaches may be inefficient due to the inclusion of additional network interface cards. The above-described approaches also introduce an additional overhead for coordination of the multiple network interfaces.

The disclosure provides for systems and methods for processing and implementing an Ethernet Audio/Video Bridging (AVB) stack comprising at least one central processor unit (CPU) having a multiple cores. The disclosure further provides for a network interface for forming a connection between the network and the multiple CPU cores, such that for all data packets received from the network, an interrupt is handled in multiple designated CPU cores for processing received data packet. Each data packet received from the network may be associated with a software module running on a designated CPU core selected based on processor load. The disclosed systems and methods may redistribute network and Ethernet stack operations to various cores by the network interface. In this way, a distributed multicore may be configured such that portion of received code which utilizes a relatively large amount of CPU resources (e.g., higher than a threshold and/or higher than non-time critical tasks) may be offloaded into another dedicated core and non-time critical tasks may be processed by a host/separate CPU or CPU core. The disclosure provides a new architecture for AVB which is highly optimized and which will help in significantly reducing the required CPU resources. The distributed processing also enables the same network traffic to be shared among multiple cores for distributed processing, which may be achieved through the concept of virtual descriptors based DMA sharing.

Figure 1:
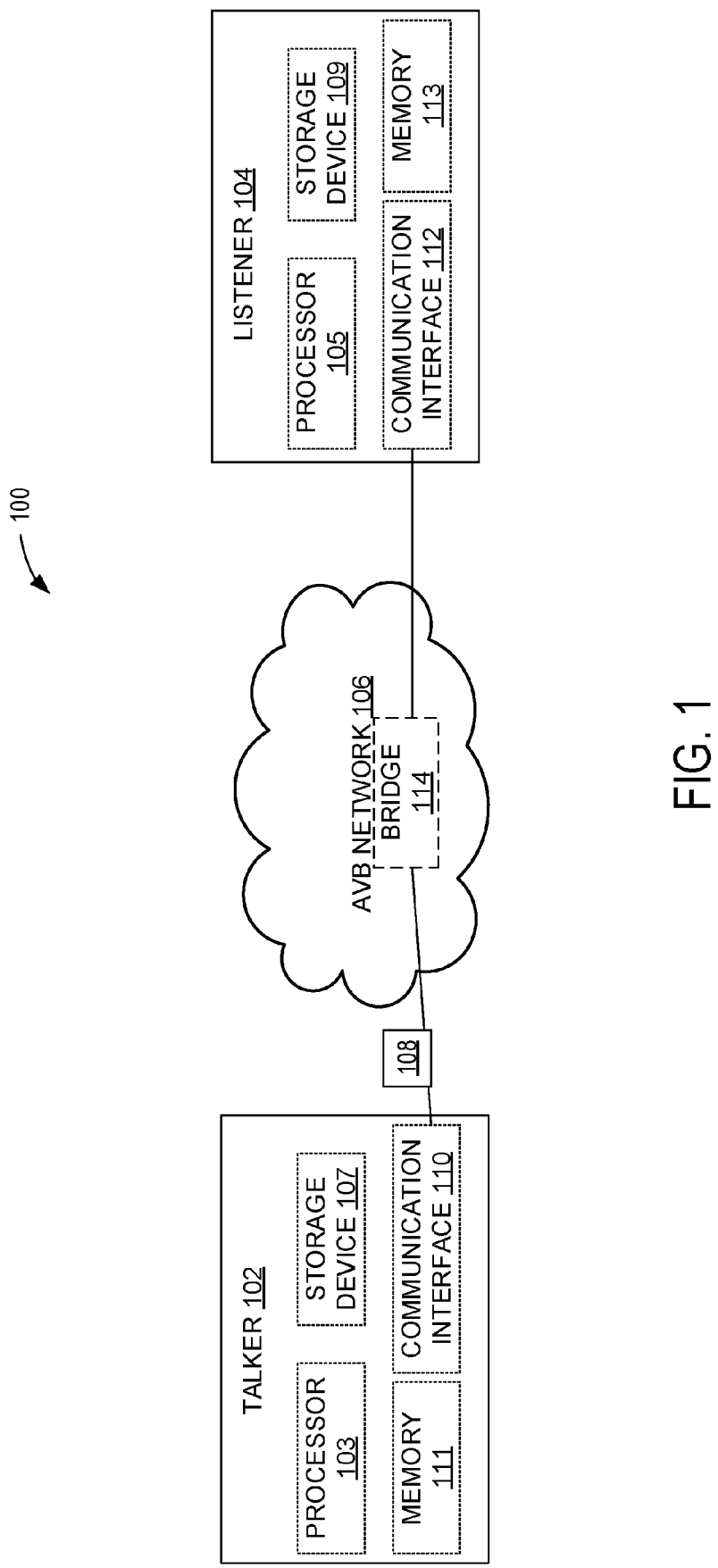
FIG. 1 shows an example communication system in accordance with one or more embodiments of the present disclosure.

FIG. 1 is an example communication system 100 including a talker 102 and a listener 104. The talker 102 may be any suitable device for sending an audio/video stream to one or more listeners (e.g., listener 104). The listener 104 may be any suitable device for receiving and playing back the audio/video stream received from one or more talkers (e.g., talker 102). For example, talker 102 may correspond to an in-vehicle computing system and listener 104 may correspond to a speaker and/or a display of a vehicle. Although illustrated as talkers/listeners, it is to be understood that one or more devices in the communication system 100 (e.g., any of talker 102 and/or listener 104) may be configured to perform multiple roles. For example, one or more devices in the system may both transmit audio/video data and receive audio/video data, thereby selectively taking on the role of a talker and a listener. The role of the talker may be to transmit information and/or data across AVB network 106. Additionally or alternatively, the role of the talker may include establishing, creating, and/or reserving a connection for the transmission of a data stream carrying the information and/or data. Additionally or alternatively, the role of the talker may be to remove or tear down the connection. The role of the listener may be to receive the information and/or the data that has been sent over network 106. Additionally or alternatively, the role of the listener may include connecting to and/or reserving a connection to the data stream. Additionally or alternatively, the role of the listener may include removing a connection to the data stream. The role of the talker/listener may be to perform both the role of the talker and the listener, either at the same time or at different times.

The devices may also take on other roles, including but not limited to a client role, a controller, a master clock device, etc. The role of the controller may include controlling the flow of the data stream between the talker and the listener or the talker/listener. The controller may control the flow of the data stream by sending one or more messages to the talker, the listener, and/or the talker/listener to create a connection and/or remove the connection of the data stream between the talker and the listener or the talker/listener. The messages may be communicated to the talker, the listener, and/or the talker/listener through a high-level application layer of the talker, the listener, and/or the talker/listener. Additionally or alternatively, the role of the controller may be to identify and/or determine which of the talkers are of importance, relevant to, and/or expected to be used by a listener. The role of the client may include determining an input, such as a user input, indicative of the creation or the removal of the connection of the data stream and communicating the input to the controller. It is to be understood that additional or alternative devices may be present in communication system 100, including but not limited to bridges, switches, routers, and other suitable network devices. For example, one or more bridges and/or switches may be included in AVB network 106 to propagate messages between one or more talkers and one or more listeners in the system and/or to establish reservations for data streams between one or more talkers and one or more listeners in the system. Each of the talker 102 and the listener 104 may include a processor (103 and 105, respectively) for executing instructions stored in the associated storage device (107 and 109, respectively) and/or memory (111 and 113, respectively).

Data such as a packet 108 may be transmitted from talker 102 (e.g., via a talker communication interface 110) to listener 104 (e.g., via a listener communication interface 112) over a network (e.g., an AVB network 106). For example, the packet 108 may be transmitted via a bridge 114 within network 106. Accordingly, talker communication interface 110 and listener communication interface 112 may be configured to communicate via an AVB network (e.g., via the audio/video transport protocol, AVTP). Talker communication interface 110 and listener communication interface 112 may include one or more ports (e.g., ingress/egress ports for respectively receiving and transmitting messages via the network) communicatively connected to ports of the bridge 114.

Prior to sending packets for a data stream, talker 102 and listener 104 may perform a reservation routine to ensure that the network and associated pathways between the devices are able to support the data stream. When the talker determines to transmit a data stream, the talker may be configured to advertise the transmission as a Layer 2 advertisement message. The Layer 2 advertisement messages may be transmitted to reserve and establish network paths over at least one network (e.g., network 106) over which the data stream may be communicated. The advertisement messages may include one or more talker attributes including but not limited to talker identifiers, listener identifiers, a type of transmission (e.g., unicast, multicast, broadcast, etc.), destination addresses (e.g., Layer 2 or MAC addresses), stream identifiers (e.g., a unique sequence of characters and/or numbers which may be assigned to only one data stream or otherwise attributable to a particular individual data stream), quality of service parameters, and/or other characteristics about the talker and/or the data stream being advertised.

One or more listeners may receive the advertisement messages and determine whether to receive the data stream being advertised. For example, the listeners may be configured to assign and/or identify the stream ID to determine whether the listener is to receive the data stream. If the data stream is to be received, the listener may register or store the Layer 2 advertisement message and/or the talker attributes. The listener may send a response (e.g., a Layer 2 ready message) indicating that the listener has determined to receive the data stream if such a determination is made. The ready message may include listener attributes (e.g., the stream ID of the data stream for comparison at a receiving talker device) for requesting receipt of the data stream being advertised. In response to receiving the ready message at the talker device that sent the advertise message, the talker device may register or store the ready message and/or the included listener attributes. In addition, the reservation and/or establishment of the data path may be completed responsive to receipt of the ready message. The reservation may include a reservation for resources and/or QoS parameters, such as bandwidth, that were identified in the Layer 2 advertisement message. In some examples, multiple paths may be reserved and/or established responsive to receipt of one or more ready messages.

Once a reservation for one or more network paths is complete and the Layer 2 advertisement and ready messages and associated talker and listener attributes are registered, the data stream may be communicated between the talker and the one or more listeners. After the communication of the data stream has ended, the talker and the one or more listeners may be configured to communicate Layer 2 termination messages to terminate the communication. In response to the Layer 2 termination messages, the reservations for the network paths may be terminated, the registrations of the Layer 2 advertisement messages, responses, and associated talker attributes may be de-registered, and any resources consumed for communication of the data stream may be made available for other communications of data streams.

One attribute in the configuration of AVB is to minimize latency in the entire transmission and processing chain. Low latency coupled with the low bandwidth of audio in turn means typically a very high interrupt load for the processing node. Each AVB class A stream means 8000 samples in a second. If a node requests to send 2 streams and receive 2 streams, this results in 32000 samples per second. Such a high processing load may be very tricky to handle on top of a normal core that processes all system tasks.

Precision time protocol (PTP) is another AVB protocol which relies on the use of carefully timestamped packets to synchronize one or more slave clocks to a master clock. Synchronous time information is distributed hierarchically, with a grand master clock at the root of the hierarchy. PTP includes two functionalities, the measurement of link delays and the distribution of time information. A master clock device synchronizes the attached slave clock devices through the use of periodic Sync and Sync Follow-Up Messages (typically every 100 ms). The slave clock devices use the information captured in these messages to perform periodic adjustments to their local clock. The master clock timestamps the transmission of the Sync Message and the slave timestamps its reception.

In some systems, the PTP application running on the host CPU may initiate the PTP message (Sync or Delay Request). The timestamp is communicated back to the CPU with an interrupt-based model so that the PTP application can send the Follow Up Message. Each MAC module may maintain a counter corresponding to adjust the nanoseconds field of the PTP time format. Since PTP Sync Messages are transmitted and received ten times per second, the CPU handles all necessary actions at a lower rate.

Figure 2:
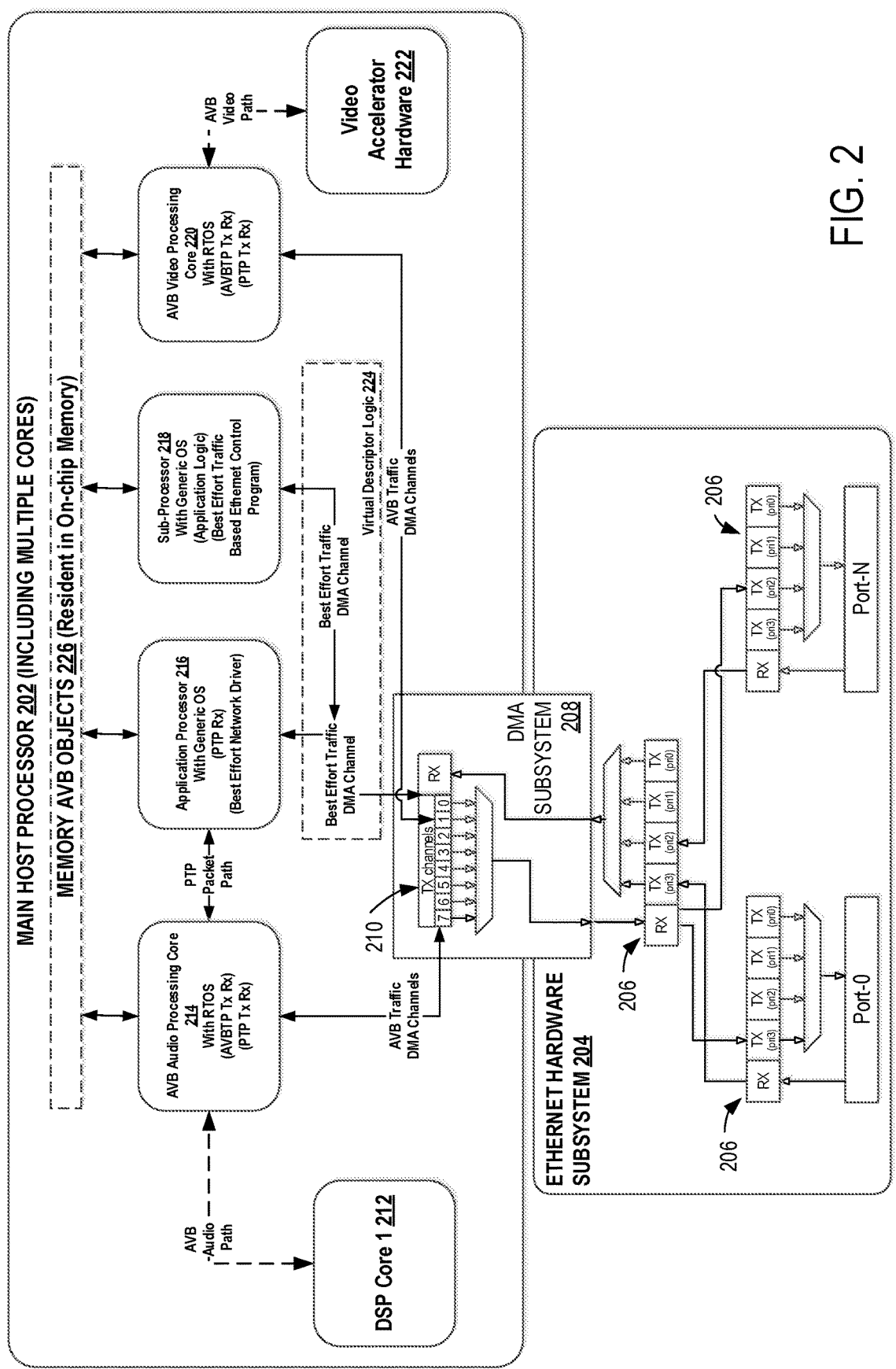
FIG. 2 schematically shows an example distributed Ethernet AVB system including a multi-core processor and Ethernet hardware subsystem in accordance with one or more embodiments of the present disclosure.

As discussed above, some systems utilize a single processing core to handle the above-described processing tasks, some of which are time-critical. In such systems, bottlenecks and other delays may be encountered while attempting to process multiple tasks, which may be undesirable in time-critical contexts. FIG. 2 shows a distributed Ethernet AVB Stack in a main host processor 202 that includes various modules distributed to multiple processing cores, thereby sharing the load such that CPU hogging tasks like AVTP (Audio video Transport Protocol) may be processed separately from other tasks. FIG. 2 also shows an Ethernet Hardware Subsystem 204 which is shared among multiple cores. The Ethernet Hardware Subsystem 204 may include N (an integer greater than or equal to one) number of ports, represented by port-0 and port-N in FIG. 2. The ports are connected to hardware FIFOs 206 which are divided into Tx and Rx paths for transmitting and receiving packets. The transmit channels of the FIFOs 206 may have priorities associated therewith that define a priority of traffic passing through that channel. Higher priority transmit channels may be used for time-critical or time-sensitive traffic, such as AVB traffic, while lower priority transmit channels may be used for non-time-critical traffic, such as Best Effort traffic. The FIFOs 206 are connected to the host process processor 202 via a direct memory access (DMA) Subsystem 208, which includes multiple channels 210, each channel being adapted to be dedicated for a particular type of packet type with the same packet priority. In the illustrated example, the DMA Subsystem 208 includes more transmit channels than the Ethernet Hardware Subsystem 204. In other examples, the transmit channels may be matched or otherwise configured based on an expected or historic throughput (e.g., where the host processor sends more data than the Ethernet Hardware Subsystem, the host processor will have more transmit channels than the Ethernet Hardware Subsystem, and vice versa).

The various CPU Cores involved may include a digital signal processing (DSP) Core 212, which may be a source of audio samples as well as media clock source, and an AVB Audio processing core 214 with a Real Time Operating system, which generates AVTP Audio streams as well as performs the PTP operations. AVB Traffic of a fixed packet priority may be mapped to come through the DMA channel assigned for AVB traffic. The AVB Audio Processing Core 214 may thus receive and transmit AVB traffic (e.g., AVTP audio streams). The AVB Audio Processing Core 214 may also receive PTP packets, such as PTP timing data (e.g., information to synchronize the AVB Audio Processing Core to the media clock source) from the DSP Core 212, and transmit the PTP timing data to other cores.

The CPU cores may additionally include an application processing core/processor 216, which may include and/or execute a generic operating system (OS). The application processing core/processor 216 may process the Ethernet traffic and receive the Best effort traffic. The main host processor 202 may also include other Sub-processors, such as sub-processor 218. Although only one sub-processor is illustrated in FIG. 2, it is to be understood that the main host processor 202 may include multiple sub-processors in other examples. The sub-processors may receive the same packets that the application processor 216 receives (e.g., duplicated packets) using a concept of virtual registers, as will be described in more detail below.

The CPU cores may further include an AVB Video Processing core 220 with a Real Time Operating system, which generates AVTP Video streams as well as performs the Video processing. AVB Traffic of a fixed packet priority may be mapped to come through the DMA channel assigned for AVB traffic. The CPU cores may further include a video accelerator hardware module 222 that provides the video samples to the AVB Video Processing core 220 to be transferred to the Ethernet Hardware Subsystem 204.

In instances where Ethernet packets are to be received and transmitted in a single-core system, descriptors may be attached to a particular channel. When Ethernet data is to be received in multiple cores, the system may utilize virtual descriptors to control routing in the host processor. Virtual descriptor logic 224 may service all received traffic and help in providing these packets to multiple separate cores through separate Ethernet queues mapped to separate Direct Memory Accesses and/or access routes (DMAs). Virtual receive descriptors may be stored inside memory for each network driver of a network device. Those virtual receive descriptors may work the same way the hardware descriptors work. So for the network driver, there may only be a different address where the receive descriptors are located. With this arrangement, Best Effort or AVB traffic can share the same receive descriptors to Ethernet driver, as well as multiple cores.

When the receiving of packets is interrupt based, synchronization of the DMA drivers—which is part of the multi core Ethernet driver in both cores—may also be performed. The synchronization may include determining and setting up rules regarding ways to handle Interrupt Mask Clearing when same interrupt comes to multiple cores after data pointers are updated in the descriptors. Without virtual receive descriptors, it may not be possible to share Ethernet data to multiple cores (as there will be additional overhead of copying data from one set of descriptors into another set of descriptors). Synchronization may be handled implicitly by keeping the read and the write cycles (e.g., for the accessed memory) separately handled. The concept of Ping and Pong buffers may be maintained, such that when the ping is updated pong is always read. In this way, audio and video samples may be maintained as uncorrupted. Also, with respect to the data structures which are commonly shared, in some examples, only read actions are permitted to be performed in parallel. Write actions may be synchronized with the AVB processing interval such that there are no synchronous writes. The operations may be synchronous such that all the tasks in various cores access the data structures based on the processing cycles triggered and accessed during the cycles.

Each of the cores may access and share Memory AVB Objects 226 that are resident in on-chip memory of the main host processor 202. Memory AVB Objects-based critical data sharing supports all cores that perform the distributed Ethernet AVB processing and provides the same information available throughout the main host processor, including PTP information, samples details, etc. The buffer operation for utilizing the Memory AVB Objects is organized as Buffer Owner and Buffer User. The functionalities of Buffer Owner and Reader are described below.

The Buffer-Owner may implement and manage operations for the buffer, allow other users to share the buffer by using DMA buffer sharing APIs, manage the details of buffer allocation, decide about the actual backing storage where this allocation happens, and/or take care of any migration of scatterlist—for all (shared) users of this buffer. The Buffer-User may be one of (many) sharing users of the buffer, may not be involved with determining how the buffer is allocated, or where, and may utilize a mechanism to acquire access to the scatterlist that makes up this buffer in memory, mapped into its own address space, so the Buffer-User can access the same area of memory. The on-chip memory may not provide any caching capabilities for Buffer-Users (e.g., processing cores) that do not include an operating system.

Since start-up timing of different processors/processing cores of the host processor may vary, the system may not be able to predict which processor/processing core will start up first or when additional processors/processing cores will become available and able to access the shared memory. Accordingly, hardware-based spring locks may be used to ensure changes in system settings are performed uniquely without concurrency or conflict-related issues.

Figure 3:
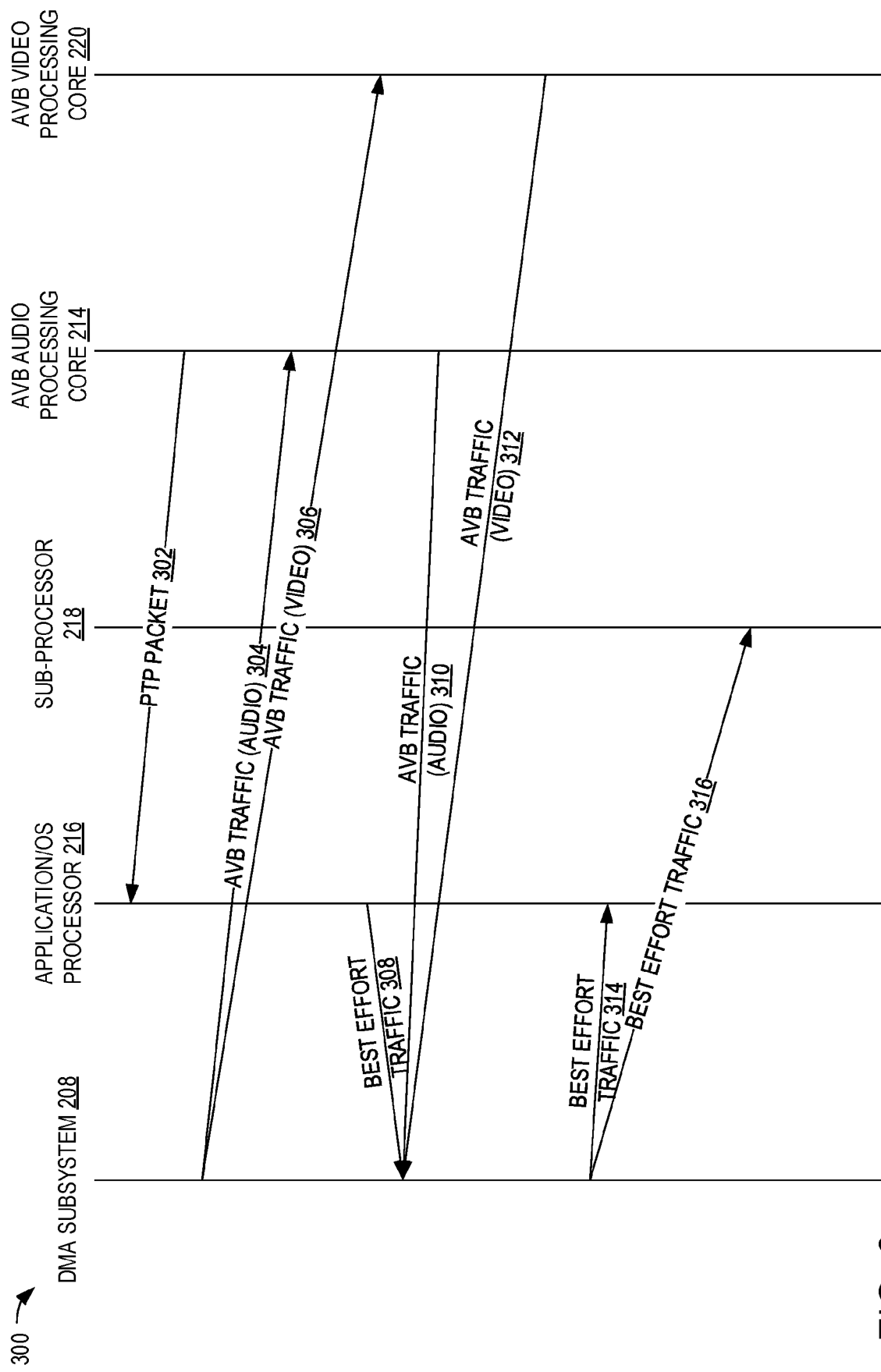
FIG. 3 is a timing diagram showing example communication timings for data communicated between processing cores in accordance with one or more embodiments of the present disclosure.

FIG. 3 is a timing diagram 300 showing example communications between the processors/processing cores and the DMA Subsystem 208 of FIG. 2. At 302, a PTP packet is transmitted from the AVB Audio Processing core 214 to the application/OS processor 216. The PTP packet may include timing information to synchronize clocks of the AVB Audio Processing core and the application/OS processor (e.g., to one another and/or to a media clock generated/maintained by DSP core 212 of FIG. 2). At 304 and 306, AVB traffic (audio and video, respectively) is transmitted simultaneously from the DMA Subsystem 208 to the AVB Audio Processing core 214 and the AVB Video Processing core 220, respectively. Due to the distributed processing cores, the AVB traffic may be processed substantially simultaneously at each dedicated processing core, freeing up resources at the application/OS processor 216 and the sub-processor 218 to perform other tasks.

At 308, best effort traffic is sent from the application/OS processor 216 to the DMA Subsystem 208. At 310 and 312, respectively, AVB Audio and Video traffic are transmitted from the AVB Audio Processing core 214 and the AVB Video Processing core 220. Since each of these transmissions are sent from different processing cores, they may be received at substantially the same time by the DMA Subsystem 208. Best effort traffic may include various kinds of non-detrimental traffic which are not sensitive to Quality of Service metrics (jitter, packet loss, latency, etc.). One example would be peer-to-peer and email applications. Traffic Shaping ensures that the best-effort traffic gets what is left after sensitive traffic. All best effort traffic are handled through a separate hardware queue which has lower priority and all AVB traffic is handled through high priority queues. Some packets may have an 802.1 Q Tag which has a VLAN header. Best effort traffic are typically untagged, while AVB traffic is typically tagged and has packet priority. Packet priority to switch priority may include handling through the switch MAC mappings such that AVB packets always gets passed through the channels with higher priority compared to Best effort traffic.

At 314, Best Effort Traffic is transmitted from the DMA Subsystem 208 to the application/OS processor 216. At substantially the same time, duplicate Best Effort Traffic 316 is transmitted from the DMA Subsystem 208 to the sub-processor 218. In this way, the Best Effort Traffic may be processed by whichever processor/sub-processor has available resources and/or a lowest processing load.

Figure 4:
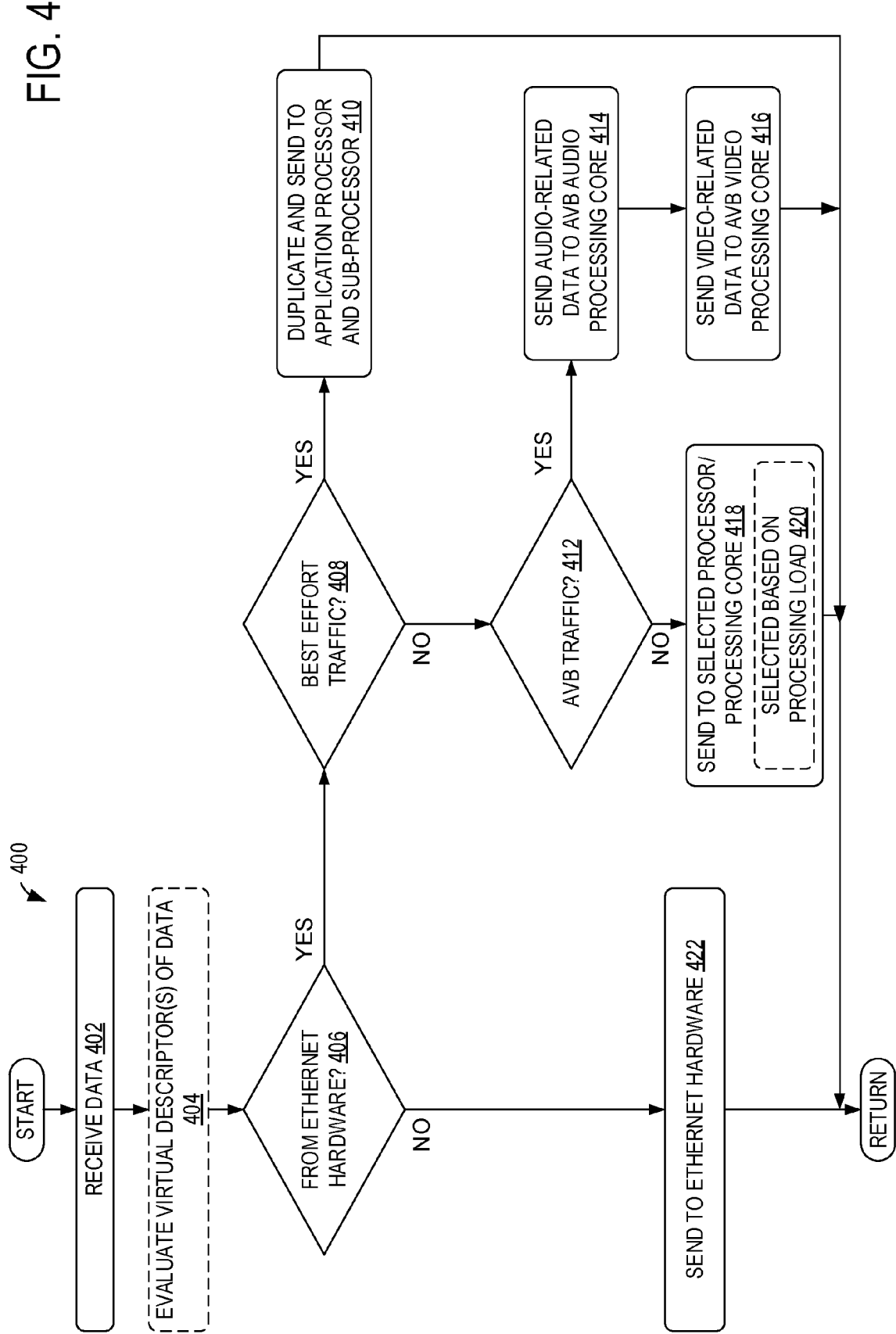
FIG. 4 is a flow chart of an example method for routing data received at a direct memory access subsystem in accordance with one or more embodiments of the present disclosure.

FIG. 4 shows a flow chart for an example method 400 of communicating data to multiple cores of a distributed Ethernet stack. For example, method 400 may be performed by a DMA Subsystem, such as DMA Subsystem 208 of FIG. 2, and/or another interface between a host processor with multiple cores (e.g., host processor 202 of FIG. 2) and an Ethernet Hardware Subsystem (e.g., Ethernet Hardware Subsystem 204 of FIG. 2). At 402, the method includes receiving data. At 404, the method optionally includes evaluating any virtual descriptors associated with the received data. The virtual descriptors may identify a processor and/or processing core to which the data is to be routed. For example, a look-up table may map different virtual descriptors to different classes of data, processors/processing cores, and/or other parameters that may affect a routing decision made by a DMA Subsystem or other logic.

At 406, the method includes determining if the data is received from an Ethernet Hardware Subsystem. If the data is received from an Ethernet Hardware Subsystem (e.g., "YES" at 406), the method proceeds to 408 to determine if the data includes Best Effort Traffic. If the data does include Best Effort Traffic (e.g., "YES" at 408), the method proceeds to 410 to duplicate the Best Effort Traffic and send the Best Effort Traffic to both an application processor (e.g., application processor 216 of FIG. 2) and a sub-processor (e.g., sub-processor 218 of FIG. 2). In examples where the data includes multiple classes of data, only the Best Effort Traffic may be transmitted to the application processor and sub-processor, and the remaining data may be evaluated according to the remaining evaluations of method 400.

If the data does not include Best Effort Traffic and/or for any data that is not Best Effort Traffic (e.g., "NO" at 408), the method proceeds to 412 to determine if the data includes AVB Traffic. If the data includes AVB Traffic (e.g., "YES" at 412), the method proceeds to 414 to send audio-related data to an AVB Audio Processing core (e.g., processing core 214 of FIG. 2). The method also proceeds to 416 to send video-related data to an AVB Video Processing core (e.g., processing core 220 of FIG. 2). In examples where the data includes multiple classes of data, only the AVB Traffic may be transmitted to the audio/video processing cores, and the remaining data may be evaluated according to the remaining evaluations of method 400.

If the data does not include AVB Traffic and/or for any data that is not AVB Traffic (e.g., "NO" at 412), the method proceeds to 418 to send the data (or any remaining data) a selected processor/processing core. As indicated at 420, the selected processor and/or processing core may be selected based on a processing load at the various cores of the host processor. For example, the selected processor and/or processing core may be selected to be the processor and/or processing core with the lowest load and/or the lowest predicted load in the host processor. In other examples, the data may be distributed across all cores with amounts corresponding to a load at each core (e.g., such that cores with higher loads receive less data and vice versa).

Returning to 406, if the data was not received from the Ethernet Hardware Subsystem (e.g., "NO" at 406), the method proceeds to 422 to send the data to the Ethernet Hardware Subsystem (e.g., since the data originated from one or more of the processing cores). If the data includes priority designations (e.g., associated with a class of the data), the DMA Subsystem may route the data to a particular transmit channel associated with the priority of the data.

Figure 5:
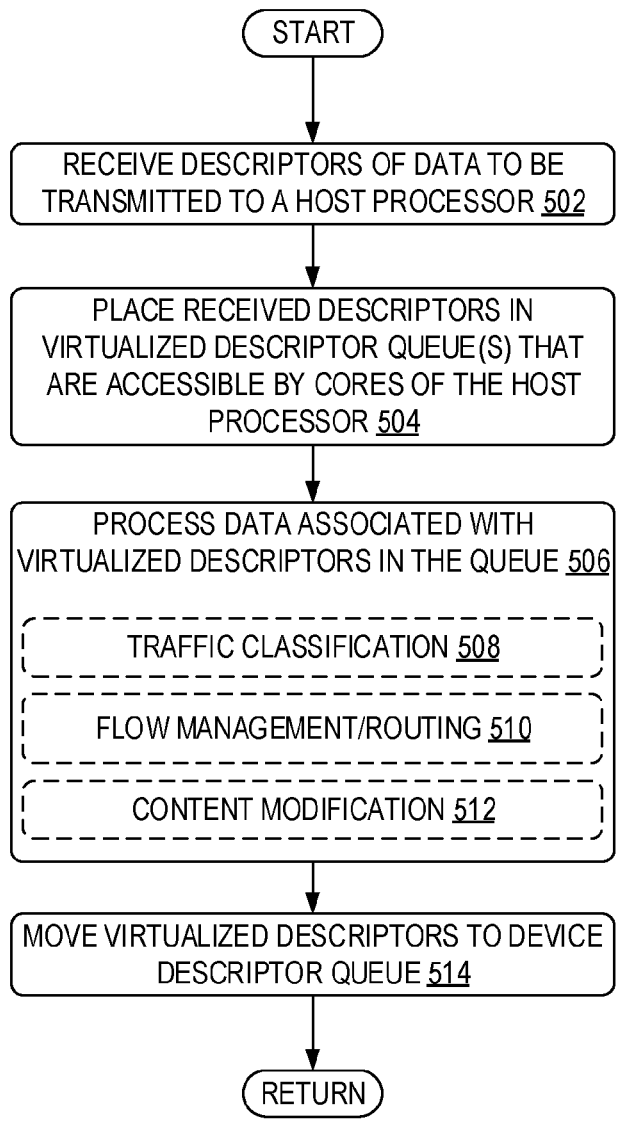
FIG. 5 is a flow chart of an example method for executing virtualized descriptor logic in accordance with one or more embodiments of the present disclosure.

FIG. 5 shows a flow chart of an example method 500 of executing virtual descriptor logic to process packets across distributed processing cores, such as the processors/processing cores of host processor 202 of FIG. 2. At 502, the method includes receiving descriptors of data to be transmitted to a host processor. At 504, the method includes placing the received descriptors in one or more virtualized descriptor queues that are accessible by cores of the host processor. For example, each of the cores may be configured to access a different virtualized descriptor queue.

At 506, the method includes processing the data associated with the virtualized descriptors in the queue. For example, the processing core associated with the virtualized queue may process packet data to perform traffic classification, as indicated at 508, flow management and/or routine, as indicated at 510, and/or content modification, as indicated at 512. The method may then proceed to 514 to move the virtualized descriptors to a device descriptor queue of an associated processor/processing core. By performing the modifications while the descriptors are in a virtualized queue, synchronization issues that may occur due to modifications of a device descriptor queue may be avoided.

The systems and methods described above also provide for a computing system comprising a main host processor including multiple processing cores and a shared on-chip memory accessible by each of the multiple processing cores, and an Ethernet hardware subsystem communicatively coupled to the main host processor via a direct memory access (DMA) subsystem, the DMA subsystem configured to route data from the Ethernet hardware subsystem to one or more of the multiple processing cores. In a first example of the computing system, the Ethernet hardware subsystem may additionally or alternatively include one or more ports communicatively connected to an Audio/Video Bridging (AVB) network to receive AVB data from the AVB network. A second example of the computing system optionally includes the first example, and further includes the computing system, wherein the main host processor includes one or more of an AVB audio processing core, and an AVB video processing core. A third example of the computing system optionally includes one or both of the first and the second examples, and further includes the computing system, wherein the main host processor includes one or more of a digital signal processing core and a video accelerator hardware module, the digital signal processing core adapted to send or receive AVB audio to or from the AVB audio processing core and the video accelerator hardware module adapted to send or receive video to or from the AVB video processing core. A fourth example of the computing system optionally includes one or more of the first through the third examples, and further includes the computing system, wherein the main host processor includes the digital signal processing core, and wherein the digital signal processing core is adapted to maintain a media clock and send precision time protocol (PTP) data to the AVB audio processing core. A fifth example of the computing system optionally includes one or more of the first through the fourth examples, and further includes the computing system, wherein the main host processor includes an application processor and one or more sub-processors, and wherein the AVB audio processing core is adapted to send precision time protocol (PTP) data to the application processor. A sixth example of the computing system optionally includes one or more of the first through the fifth examples, and further includes the computing system, wherein the application processor and the one or more sub-processors are adapted to received best effort traffic, and wherein the AVB audio processing core and the AVB video processing core are adapted to receive AVB traffic. A seventh example of the computing system optionally includes one or more of the first through the sixth examples, and further includes the computing system, wherein each of the AVB audio processing core and the AVB video processing core includes a real-time operating system. An eighth example of the computing system optionally includes one or more of the first through the seventh examples, and further includes the computing system further comprising virtual descriptor logic executable to queue virtual descriptors of the data routed by the DMA subsystem. A ninth example of the computing system optionally includes one or more of the first through the eighth examples, and further includes the computing system, wherein the shared on-chip memory comprises one or more memory AVB objects accessible by each of the multiple processing cores. A tenth example of the computing system optionally includes one or more of the first through the ninth examples, and further includes the computing system, wherein the shared on-chip memory includes one or more hardware-based spring locks adapted to control access to the on-chip memory.

The systems and methods described above also provide for a method of distributing a processing load between multiple cores of a host processor in an Audio/Video Bridging (AVB) computing system, the method comprising receiving data, from an Ethernet hardware subsystem of the AVB computing system, at a direct memory access (DMA) subsystem of the AVB computing system, determining if the data includes best effort traffic or AVB traffic, responsive to determining that the data includes best effort traffic, transmitting the best effort traffic to an application processor of the host processor, and, responsive to determining that the data includes AVB traffic, transmitting the AVB traffic to one or more of an AVB audio processing core of the host processor and an AVB video processing core of the host processor. In a first example of the method, the method additionally or alternatively further includes duplicating the best effort traffic and transmitting the duplicated best effort traffic to a sub-processor of the host processor responsive to determining that the data includes best effort traffic. A second example of the method optionally includes the first example, and further includes the method further comprising evaluating virtual descriptors associated with the received data and selectively processing the data based on the virtual descriptors. A third example of the method optionally includes one or both of the first and the second examples, and further includes the method, wherein the best effort traffic is transmitted to the application processor substantially simultaneously to transmitting the AVB traffic to the one or more of the AVB audio processing core and the AVB video processing core. A fourth example of the method optionally includes one or more of the first through the third examples, and further includes the method, further comprising receiving, substantially simultaneously, AVB traffic from one or more of the AVB audio processing core and the AVB video processing core, and best effort traffic from the application processor.

The systems and methods described above also provide for an AVB computing system comprising a main host processor including at least one AVB data processing core, at least one application processor, and a shared on-chip memory accessible by each of the at least one AVB data processing core and the at least one application processor, a direct memory access (DMA) subsystem comprising one or more transmit channels and one or more receive channels, and an Ethernet hardware subsystem communicatively coupled to the main host processor via the direct memory access (DMA) subsystem, the DMA subsystem configured to route data between the Ethernet hardware subsystem and one or more of the at least one AVB data processing core and the at least one application processor. In a first example of the AVB computing system, the at least one AVB data processing core additionally or alternatively includes an AVB audio processing core and an AVB video processing core, and the host processor additionally or alternatively further includes a digital signal processing core coupled to the AVB audio processing core and a video accelerator hardware module coupled to the AVB video processing core. A second example of the AVB computing system optionally includes the first example, and further includes the AVB computing system, wherein the digital signal processing core is adapted to maintain a media clock and transmit precision time protocol (PTP) information to the AVB audio processing core, the AVB audio processing core adapted to transmit PTP information to the application processor. A third example of the AVB computing system optionally includes one or both of the first and the second examples, and further includes the AVB computing system, wherein the host processor further includes one or more sub-processors, the one or more sub-processors adapted to receive duplicated best effort traffic that is the same as best effort traffic received by the application processor.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the processors/processing cores of the main host processor 202, the DMA Subsystem 208, and the Ethernet hardware subsystem 204 of FIG. 2. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A computing system comprising:
 a main host processor including multiple processing cores and a shared on-chip memory accessible by each of the multiple processing cores; and
 an Ethernet hardware subsystem communicatively coupled to the main host processor via a direct memory access (DMA) subsystem, the DMA subsystem configured to route data from the Ethernet hardware subsystem to one or more of the multiple processing cores,
 wherein the main host processor includes a digital signal processing core and an Audio/Video Bridging (AVB) audio processing core, and wherein the digital signal processing core is adapted to maintain a media clock and send precision time protocol (PTP) data to the AVB audio processing core; and
 wherein the main host processor includes an application processor and one or more sub-processors, and wherein the AVB audio processing core is adapted to send the precision time protocol (PTP) data to the application processor.

2. The computing system of claim 1, wherein the Ethernet hardware subsystem includes one or more ports communicatively connected to an AVB network to receive AVB data from the AVB network.

3. The computing system of claim 2, wherein the main host processor further includes an AVB video processing core.

4. The computing system of claim 3, wherein the main host processor further includes a video accelerator hardware module, wherein the digital signal processing core is adapted to send or receive AVB audio to or from the AVB audio processing core, and wherein the video accelerator hardware module is adapted to send or receive video to or from the AVB video processing core.

5. The computing system of claim 3, wherein the application processor and the one or more sub-processors are adapted to receive best effort traffic, and wherein the AVB audio processing core and the AVB video processing core are adapted to receive AVB traffic.

6. The computing system of claim 3, wherein each of the AVB audio processing core and the AVB video processing core includes a real-time operating system.

7. The computing system of claim 2, further comprising virtual descriptor logic executable to queue virtual descriptors of the data routed by the DMA subsystem.

8. The computing system of claim 2, wherein the shared on-chip memory comprises one or more memory AVB objects accessible by each of the multiple processing cores.

9. The computing system of claim 8, wherein the shared on-chip memory includes one or more hardware-based spring locks adapted to control access to the shared on-chip memory.

10. A method of distributing a processing load between multiple cores of a host processor in an Audio/Video Bridging (AVB) computing system, the method comprising:
receiving data, from an Ethernet hardware subsystem of the AVB computing system, at a direct memory access (DMA) subsystem of the AVB computing system;
determining if the data includes best effort traffic or AVB traffic;
responsive to determining that the data includes best effort traffic, transmitting the best effort traffic to an application processor of the host processor and duplicating the best effort traffic and transmitting the duplicated best effort traffic to a sub-processor of the host processor; and
responsive to determining that the data includes AVB traffic, transmitting the AVB traffic to one or more of an AVB audio processing core of the host processor and an AVB video processing core of the host processor,
the method further comprising maintaining a media clock at a digital signal processing core of the host processor and sending precision time protocol (PTP) data from the digital signal processing core to the AVB audio processing core.

11. The method of claim 10, further comprising evaluating virtual descriptors associated with the received data and selectively processing the data based on the virtual descriptors.

12. The method of claim 10, wherein the best effort traffic is transmitted to the application processor simultaneously to transmitting the AVB traffic to the one or more of the AVB audio processing core and the AVB video processing core.

13. The method of claim 10, further comprising receiving, simultaneously, AVB traffic from one or more of the AVB audio processing core and the AVB video processing core, and best effort traffic from the application processor.

14. An AVB computing system comprising:
a main host processor including at least one AVB data processing core, at least one application processor, and a shared on-chip memory accessible by each of the at least one AVB data processing core and the at least one application processor;
a direct memory access (DMA) subsystem comprising one or more transmit channels and one or more receive channels; and
an Ethernet hardware subsystem communicatively coupled to the main host processor via the DMA subsystem, the DMA subsystem configured to route data between the Ethernet hardware subsystem and one or more of the at least one AVB data processing core and the at least one application processor, wherein the DMA subsystem is configured to route best effort traffic to the at least one application processor and to route AVB traffic to the at least one AVB data processing core, wherein the host processor further includes one or more sub-processors, the one or more sub-processors adapted to receive duplicated best effort traffic that is the same as best effort traffic received by the application processor.

15. The AVB computing system of claim 14, wherein the at least one AVB data processing core includes an AVB audio processing core and an AVB video processing core, the host processor further including a digital signal processing core coupled to the AVB audio processing core and a video accelerator hardware module coupled to the AVB video processing core.

16. The AVB computing system of claim 15, wherein the digital signal processing core is adapted to maintain a media clock and transmit precision time protocol (PTP) information to the AVB audio processing core, the AVB audio processing core adapted to transmit PTP information to the application processor.

* * * * *